US010011810B2

(12) United States Patent
Matsui et al.

(10) Patent No.: US 10,011,810 B2
(45) Date of Patent: Jul. 3, 2018

(54) METHOD FOR PRODUCING BEER-TASTE BEVERAGE

(71) Applicant: SUNTORY HOLDINGS LIMITED, Osaka-shi, Osaka (JP)

(72) Inventors: Hiroo Matsui, Osaka (JP); Takako Inui, Osaka (JP); Mariko Ishimaru, Osaka (JP); Daisaku Yonezawa, Osaka (JP)

(73) Assignee: SUNTORY HOLDINGS LIMITED, Osaka-shi, Osaka (JP)

( * ) Notice: Subject to any disclaimer, the term of this patent is extended or adjusted under 35 U.S.C. 154(b) by 0 days.

(21) Appl. No.: 14/345,676

(22) PCT Filed: Sep. 3, 2013

(86) PCT No.: PCT/JP2013/073678
§ 371 (c)(1),
(2) Date: Mar. 19, 2014

(87) PCT Pub. No.: WO2014/038546
PCT Pub. Date: Mar. 13, 2014

(65) Prior Publication Data
US 2014/0220179 A1 Aug. 7, 2014

(30) Foreign Application Priority Data

Sep. 7, 2012 (JP) .................. 2012-197700

(51) Int. Cl.
C12C 7/20 (2006.01)
C12G 3/02 (2006.01)
C12C 3/00 (2006.01)
A23L 2/38 (2006.01)
A23L 2/54 (2006.01)
A23L 2/56 (2006.01)
C12C 5/02 (2006.01)

(52) U.S. Cl.
CPC .............. C12C 7/205 (2013.01); A23L 2/382 (2013.01); A23L 2/54 (2013.01); A23L 2/56 (2013.01); C12C 3/00 (2013.01); C12C 5/026 (2013.01); C12G 3/02 (2013.01)

(58) Field of Classification Search
CPC .......... C12C 5/026; C12C 5/00; C12C 7/205; C12C 5/02; C12C 7/00; C12C 7/287
USPC ... 426/600, 592, 16, 11, 29, 590, 330.4, 534
See application file for complete search history.

(56) References Cited

FOREIGN PATENT DOCUMENTS

JP 2010-178628 A 8/2010
JP 2012-105592 6/2012

OTHER PUBLICATIONS

Extended European Search Report dated Jul. 16, 2015 issued in corresponding European Patent Application No. 13834760.4 (7 pages).
Lam et al., "Aging of Hops and Their Contribution to Beer Flavor", Journal of Agricultural and Food Chemistry, vol. 34, No. 4, Jul. 1, 1986, pp. 763-770.
Howard et al., "Development of Resins During the Ripening of Hops", Journal of the Institute of Brewing, vol. 62, No. 3, May 6, 1956, pp. 251-256.
Chinese Office Action and Search Report dated Feb. 2, 2015 issued in corresponding Chinese Patent Application No. 201380004358.5 (3 pages).
Wang et al., "Food Fermantation Technology," Chinese Metrology Press, Dec. 2010, Chapter 3, Beer Production, pp. 25-37 (in Chinese, with partial translation).
He et al., "Nutrition condition variation in root zone of different aged hops and its relation to yields and quality," Pratacultural Science, Jun. 20, 2008, vol. 25, No. 6, pp. 76-79 (in Chinese language, with English abstract and partial translation).
International Search Report dated Dec. 10, 2013 issued in PCT/JP2013/073678 filed Sep. 3, 2013 (2 pages).
Miyachi et al., "Beer Jozo Gijutsu," 1st edition, Dec. 28, 1999, pp. 31 to 33, 47 to 49, 53 to 57, 62.
Pluháčková, et al., "Hop essential oils in the selected varieties from differently old hop yards," Kvasny Prumysl, 2011, vol. 57, No. 7-8, pp. 266-271.
Mikyška et al., "Impact of hop pellets storage on beer quality," Kvasny Prumysl, May 25, 2012, vol. 58, No. 5, pp. 148-154.
Srečec, et al., "Empiric mathematical model for predicting the content of alpha-acids in hop (Humulus lupulus L.) cv. Aurora," Springer Plus, Feb. 19, 2013, vol. 2, 59, doi:10.1186/2193-1801-2-59.
Krofta, et al., "Mathematical Model for Prediction of Alpha Acid Contents from Meterological Data for 'Saaz' Aroma Variety," Proceedings of the Second International Humulus Symposium (ISBN:978 90 6605 722 7) 2009, 131-139.
Australian Office Action dated May 1, 2015 issued in corresponding Australian Patent Application No. 2013313454 (3 pages).
Brewers' Guardian; "Hops and Hop Products", Apr. 1999, pp. 31-34.
Jelinek L. et al., "Influence of Growing Area, Plant age, and Virus Infection on the Contents of Hop Secondary Metabolites", Czech. J. Food Sci. 2012, vol. 30, No. 6, 541-547.
Vynosu H. et al., "The Evaluation of Yield and Alpha-Bitter Acid Content in Selected Hop Varieties", Rostlinna Vyroba, 44, 1998(7), 305-312.

Primary Examiner — Vera Stulii
(74) Attorney, Agent, or Firm — Drinker Biddle & Reath LLP

(57) ABSTRACT

A method for producing a beer-taste beverage characterized in that the method includes adding a hop selected based on hop plant age; and a method for adjusting aroma and taste of a beer-taste beverage, characterized by the use of a hop selected based on hop plant age. According to the present invention, characteristics of aroma and taste attributable from different hops can be made into different ones by using hops of different plant age. In addition, crops of different hop plant age having their own characteristics are properly blended, whereby a beer-taste beverage having preferred characteristics and intensities of aromas, and taste can be provided.

5 Claims, 6 Drawing Sheets

FIG. 1 [Saaz Variety]
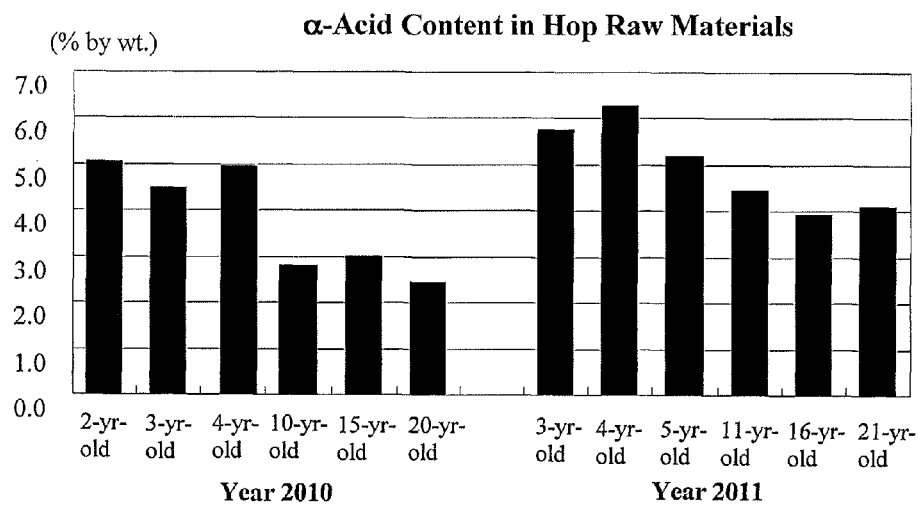
FIG. 2 [Saaz Variety]
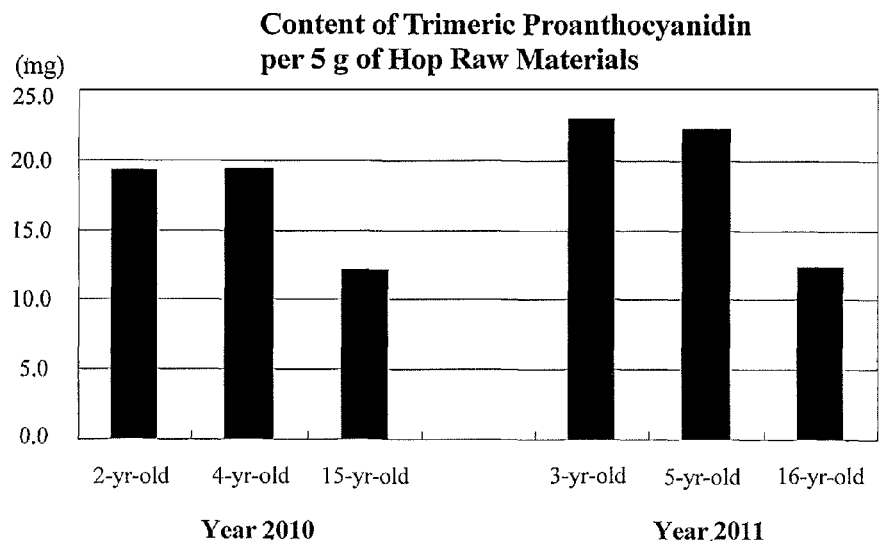

FIG. 3 [Saaz Variety]
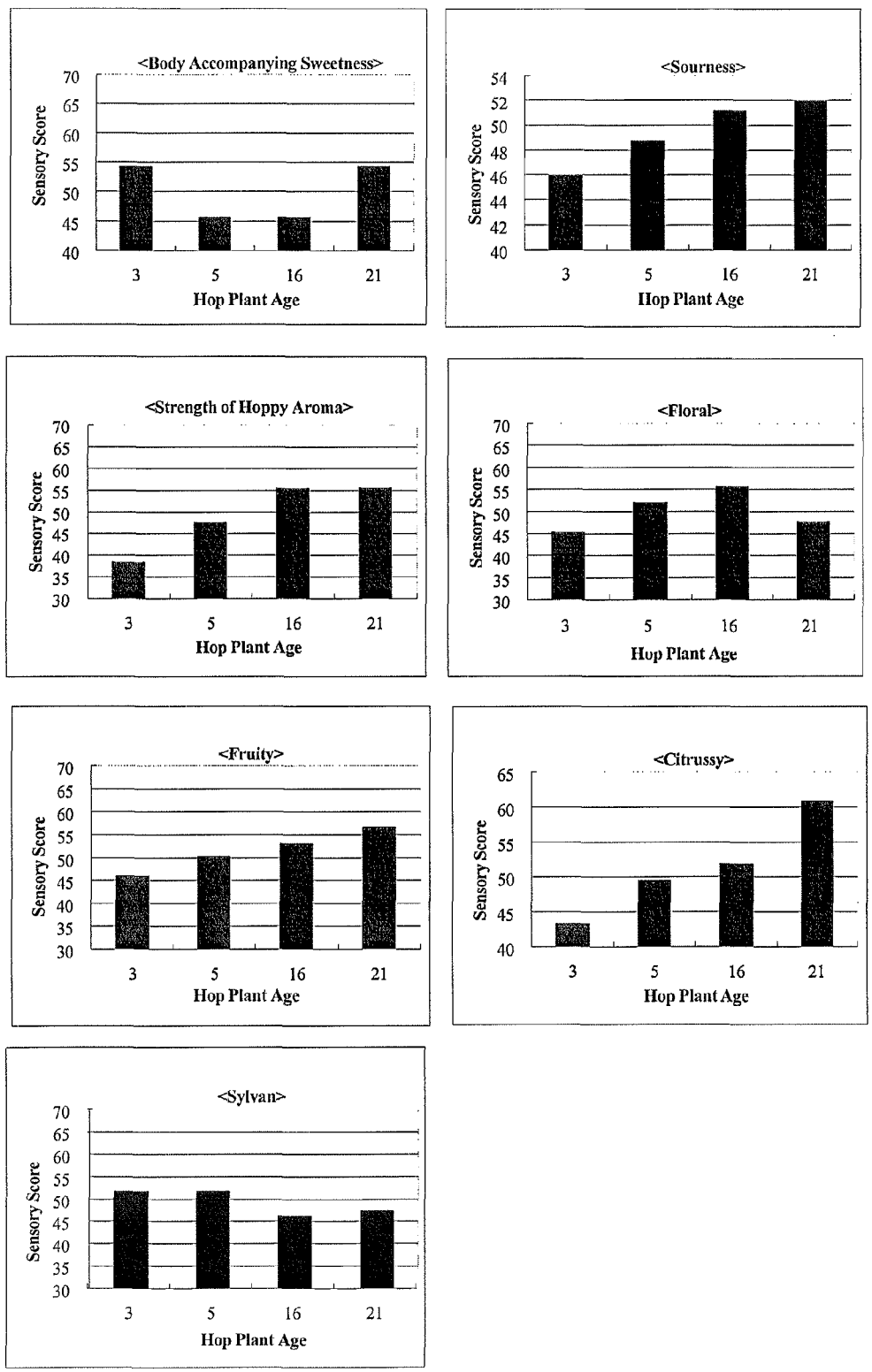

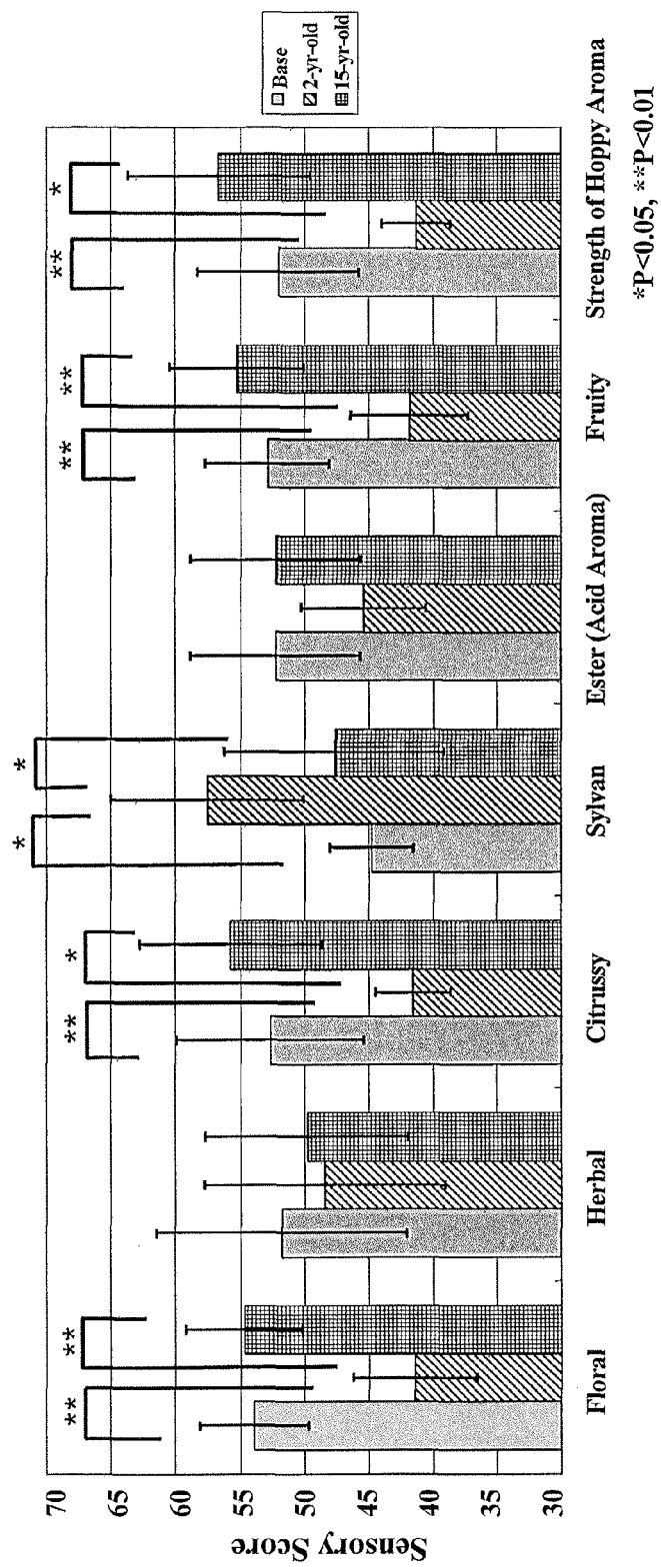
FIG. 4 [Saaz Variety]

FIG. 5 [Saaz Variety]
(A) 2-yr-old
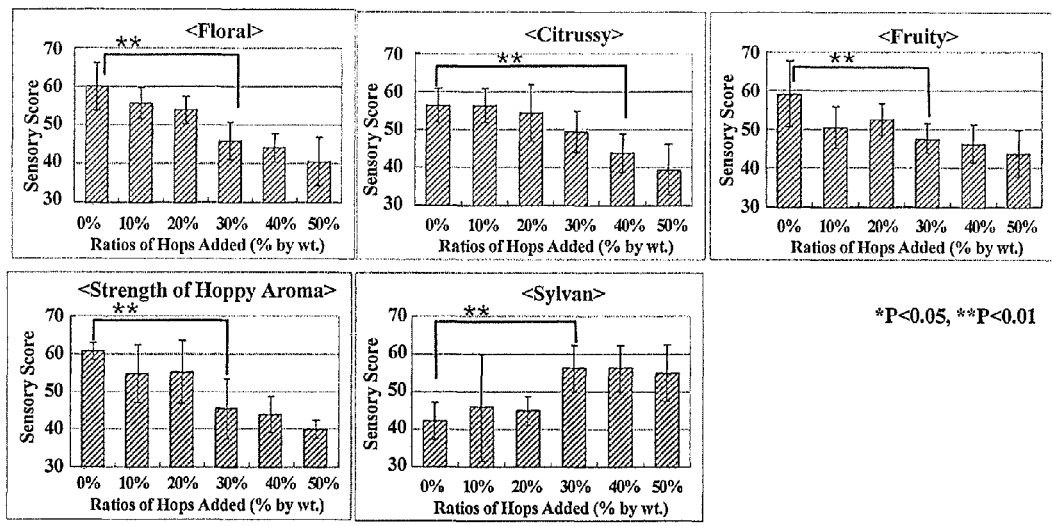
(B) 15-yr-old
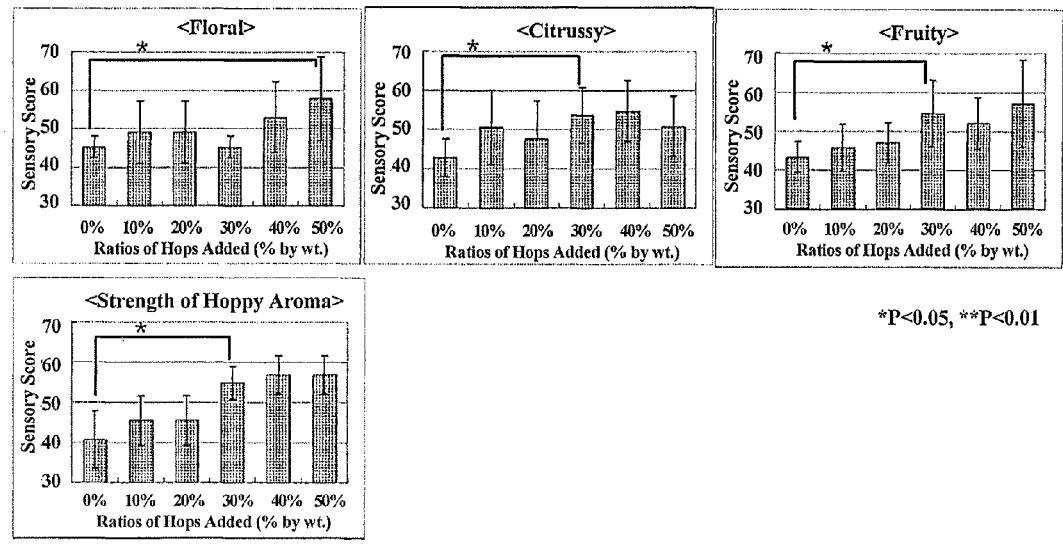

METHOD FOR PRODUCING BEER-TASTE BEVERAGE

CROSS REFERENCE TO RELATED APPLICATIONS

This application is the National Stage of International Application No. PCT/JP2013/073678, filed Sep. 3, 2013, and claims benefit of Japanese Application No. 2012-197700, filed on Sep. 7, 2012, all of which are herein incorporated by reference in their entirety.

TECHNICAL FIELD

The present invention relates to a method for producing a beer-taste beverage. More specifically, the present invention relates to a method for producing a beer-taste beverage using a hop, a method for adjusting aroma and taste of a beer-taste beverage using the same hop, and a hop processed product for use in these methods.

BACKGROUND ART

In beer-taste beverages, raw materials such as malts and hops greatly affect their qualities. For example, hops not only give bitterness to beer-taste beverages but also give refreshing hoppy aroma and a body. Bitterness is attributable to an α-acid in the hops, hoppy aroma attributable to terpenes, and a body attributable to polyphenols, and the like, so that each of them is attributable to various ingredients. Accordingly, the bitterness, the hoppy aroma, and the body of the beer-taste beverages have been conventionally adjusted by selecting the methods of brewing, varieties to be used, and processed products depending upon the hops used.

As the selection of the methods of brewing, when hops are added to a wort boil, quality can be controlled by adding the hops at an initial stage, adding the hops in an intermediary stage, or adding the hops at a second-half of a wort boiling step or after a fermentation step. When added at an initial stage, an α-acid attributable to bitterness is sufficiently isomerized, so that high-quality bitterness can be extracted. On the other hand, a majority of the terpenes attributable to aroma would evaporate away. When added at a second-half stage, the terpenes attributable to aroma would remain, surely giving a hoppy aroma; however, on the other hand, isomerization of an α-acid would be insufficient, so that the bitterness may possibly not harmonize with the beer. In addition, other methods include dry hopping in which hops are dipped in a fermented and stored liquor. In the case of dry hopping, a fresh aroma distinctively owned by raw hops is given.

As the varieties to be used, hops are roughly classified into bitter varieties having a high α-acid content mainly purposed in giving bitterness, and aroma varieties giving high-quality aroma, and varieties of over 100 are being cultivated in the global markets. By selecting varieties having diversified qualities on these bitterness, aroma and body, a desired beer-taste beverage can be made and developed.

The processed products are "dry hop flowers" in which the hop flowers are simply dried after the harvest; "hop pellets" in which dried hop flowers are pulverized and pelletized; or "a hop extract" in which only a bitterness ingredient or a polyphenol ingredient is extracted from the hop pellets. By using these processed products according to their purposes, a desired beer-taste beverage can be made and developed.

However, since the hops are agricultural products, it is understood that the quality differences are caused by cultivation factors. Therefore, in actual situations, it is difficult to stably develop a desired quality simply by selecting the methods of brewing, varieties to be used, and processed products. Therefore, the elucidation of the influences of the cultivation factors on the qualities of the hop raw materials would be important to stably develop and make a beer-taste beverage having a desired quality with excellent accuracy.

The cultivation factors which are considered to influence the hop qualities include the followings: Basic factors such as soils, human factors such as methods of cultivation, climactic factors such as temperature and rainfall, and the like. It can be found with the senses that the cultivation factors as listed herein influence the qualities of hops; meanwhile, for example, it has been confirmed in Non-Patent Publication 1 that as to the Saaz hops, the analysis of the climates at plant year age and an α-acid, which is a bitterness ingredient, has been carried out. It has been confirmed from the data that the values of the α-acid, which is the bitterness ingredient, are greatly fluctuated by the climactic factors such as temperature, humidity and the number of sunshine days.

On the other hand, Patent Publication 1 discloses a method of controlling the qualities of bitterness ingredients of hops by coming up with methods of storing hops after the harvest or methods of fermentation thereof.

RELATED ART REFERENCES

Patent Publications

Patent Publication 1: Japanese Patent Laid-Open No. 2012-105592

Non-Patent Publications

Non-Patent Publication 1: Krofta et al., Mathematical Model for Prediction of Alpha Acid Contents from Meteorological Data for Saaz' Aroma Variety, *Proceedings of the Second International Humulus Symposium* (ISBN:978 90 6605 722 7)2009, 131-139

SUMMARY OF THE INVENTION

Problems to be Solved by the Invention

However, Non-Patent Publication 1 does not report the aroma ingredient or the body ingredient. Also, Patent Publication 1 does not propose individual methods of storage or methods of fermentation for diversified qualities of hops after harvest. Accordingly, in the present situation, the variances in the qualities (bitterness ingredient, aroma ingredient, and body ingredient) of hop raw materials that influence the qualities of beer-taste beverages and causations thereof (cultivation factors) are not elucidated in detail.

An object of the present invention is to provide a method for stably making and developing a desired beer quality by remarking on "hop plant age" of hops as one of the cultivation factors, and clarifying the influences of this hop plant age on the qualities of a beer-taste beverage.

Means to Solve the Problems

Specifically, the present invention relates to the following [1] to [3]:

[1] a method for producing a beer-taste beverage characterized in that the method includes adding a hop selected based on hop plant age;

[2] a method for adjusting aroma and taste of a beer-taste beverage, characterized by the use of a hop selected based on hop plant age; and

[3] a hop processed product containing a hop selected based on hop plant age, for use in the method as defined in the above [1] or [2].

Effects of the Invention

According to the method for production of the present invention, it is possible to select a hop remarking on hop plant age of the hop, thereby making it possible to accurately make a desired beer-taste beverage. Also, the method can also contribute not only to its qualities but also to cost reduction by using a minimally needed amount of the hops.

BRIEF DESCRIPTION OF THE DRAWINGS

FIG. 1 is a graph showing the content of $\alpha$-acids in the hops.

FIG. 2 is a graph showing the content of trimeric proanthocyanidin in the hops.

FIG. 3 are graphs showing the results of sensory evaluations for the beers of Examples.

FIG. 4 is a graph showing the results of sensory evaluations for the beers of Examples.

FIG. 5 are graphs showing the results of sensory evaluations for the beers of Examples, wherein (A) shows the results of beers using hops being of hop plant age of 2-year-old, and (B) shows the results of beers using hops being of hop plant age of 15-year-old.

MODES FOR CARRYING OUT THE INVENTION

Figure 6:
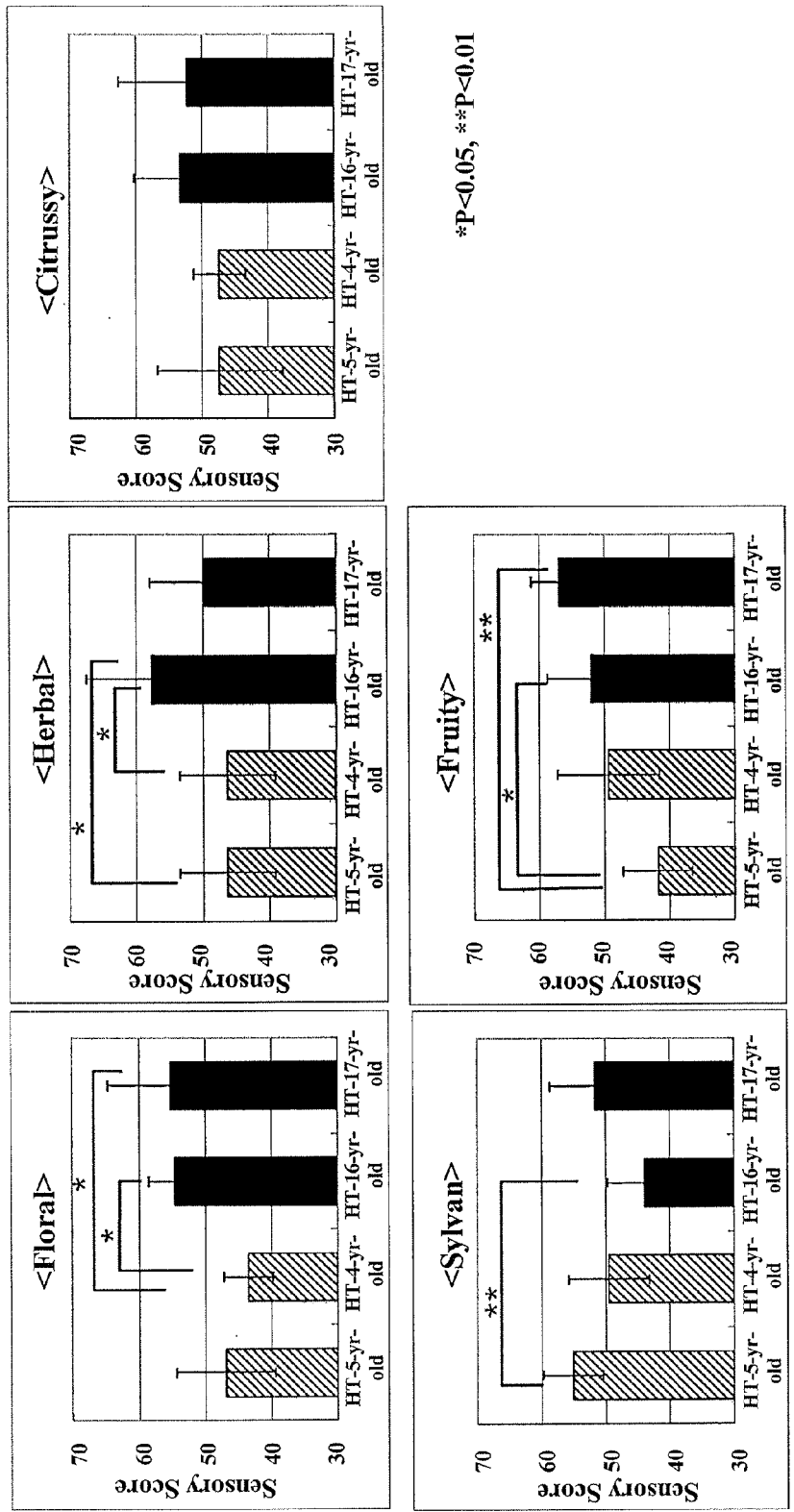
FIG. 6 are graphs showing the results of sensory evaluations for the beers of Examples.

The method for producing a beer-taste beverage of the present invention is characterized in that the method includes adding a hop selected based on hop plant age. In other words, in the present invention, the present inventors have found for the first time that the qualities of the hops greatly fluctuate depending upon hop plant age, especially a bitterness ingredient, an aroma ingredient, and an ingredient concerning a body or the like (hereinafter referred to as "a body ingredient") respectively show different tendencies depending upon hop plant age. The present invention has a great feature in selecting a hop suitable for intended beer taste based on the tendencies. Here, the term "hop plant age" of a hop as used herein means a hop usually budding in April to May and harvesting its flowers in August to September, where the hop that is planted and then harvested in the year in which cones are formed for the first time is referred to as one-year-old.

The term "beer-taste beverage" as referred to herein refers to a carbonated beverage having a beer-like flavor. In other words, unless specified otherwise, the beer-taste beverage of the present specification embraces all the carbonated beverages having beer flavor, regardless of the presence or absence of a fermentation step with an yeast. Specific examples include beers, Happoushu (low-malt beers), other miscellaneous liquors, liqueurs, nonalcoholic beverages and the like.

The tendencies based on hop plant age of the hops will be explained herein below.

The hops in the present invention are not particularly limited in the areas of produce and varieties, so long as the hops are selected based on hop plant age, and known aroma hops, bitter hops, and the like may be used. Specifically, exemplifications include aroma hops such as Hallertauer Mittelfrueh, Hallertauer Tradition, Hersbrucker, Perle, Tettnanger, Cascade, Saaz, Sladek and the like; and bitter hops such as Northern Brewer, Herkules, Magnum, Nugget, Taurus, Galaxy, Target and the like.

As the hops used in the production of beer, a hop flower part constituted by lupulin containing a resin and a purified oil, and cones containing a phenolic (tannin) is mainly used. The resin ingredient contains, in addition to an $\alpha$-acid, which is a bitterness ingredient, primarily a $\beta$-acid, and the purified oil ingredient contains a terpene. More specifically, the terpene includes monoterpenes which are considered to be attributable to splendid aroma (as in flowers and the like), and sesquiterpenes which are considered to be attributable to mild aroma (as in bark and the like). The monoterpenes include myrcene, linalool, geraniol, limonene, and the like, and the sesquiterpenes include caryophyllene, humulene, farnessen, and the like. In addition, the phenolic ingredient includes hydroxybenzoic acid, hydroxycinnamic acid, proanthocyanidins, flavonoids, and polymers thereof. Among them, the trimeric proanthocyanidin is considered to be attributable to a body and robustness.

Here, methods of finding out the relevancy of various kinds of ingredients contained in the hops and hop plant age are described. First, in order to confirm the difference in qualities for each of hop plant age of hops, the "raw materials" themselves of the hops are analyzed separately by hop plant age. Specifically, the respective contents of the $\alpha$-acids attributable to bitterness, the terpene attributable to aroma, and the polyphenol (trimeric proanthocyanidin) attributable to a body in the hops are measured for each hop plant age. Next, the relevancy of the above-mentioned ingredient contents and hop plant age are evaluated for each ingredient to grasp the tendencies.

Here, the contents of each ingredient can be measured by using a known method depending upon the properties of the ingredients.

For example, the $\alpha$-acid can be measured in accordance with Method 7.7 of "Analytica-EBC" prescribing the analytical method published by the EBC (the European Brewery Convention). In the present specification, the measurements can be made in accordance with the method described in Examples set forth below.

The terpene can be measured in accordance with "ASBC Methods of Analysis" prescribing the analytical method published by ASBC (The American Society of Brewing Chemists). In the present specification, the terpene can be measured in accordance with the method described in Examples set forth below. Here, the above method is a method for measuring a terpene in the hops, and the terpene in the beer can be measured in accordance with the method described in Examples set forth below, for example, in accordance with a GC/MS method.

The polyphenol can be measured in accordance with a method described in Examples set forth below, for example, in accordance with an HPLC method.

The contents of each ingredient thus obtained are shown for each hop plant age. For example, with respect to each ingredient such as a bitterness ingredient, an aroma ingredient, and a body ingredient hop plant age is plotted as the axis of abscissas against the contents thereof as the axis of ordinates, thereby making it possible to grasp the tendencies based on hop plant age for each ingredient. At this time, plots may be taken against hop plant age regardless of the harvest year, and the plots may be taken against hop plant age for each harvest year in order to consider the influences of the climactic factors. When plotted for each harvest year, common tendencies may be preferably found. Also, the phrase "selected based on hop plant age" or "selected based on hop plant age" as used herein may refer to not only a case where the hops are selected or selected by age but also a case where the hops are selected as a group of hop plant age in which ages of several years are collectively made into one group. Specifically, for example, as to the selection (selected) based on specified hop plant age, a hop plant of an age within a specified age ±2 years can be selected, and one hop plant age may be singly selected or those of different hop plant age may be selected in combination, so long as the hop plant is of age within the above range, and may or may not include those of hop plant age with the median of the above range (of specified hop plant age). When used in combination, the hop plant age may be contiguous or non-contiguous within the above range. Here, the hop plant that is included within the above range may be referred to as one hop plant age group; for example, a group composed of 5-year-old or younger may be referred to as "infantile hop plant age," a group composed of from 6 to 10-year-olds as "young hop plant age," a group composed of from 11 to 15-year-olds as "adolescent hop plant age," a group composed of from 16 to 20-year-olds as "middle-aged hop plant age," and a group composed of 20-year-old or older as "old-age hop plant age." In addition, as the method of combining hop plants of different hop plant age, hop plants from two or more hop plant age groups can be combined. In that case, one hop plant age group and the other hop plant age group may be respectively selected from each of the groups in the same manner as above so long as the hop plant age at the median of each of the groups differs by at least one year, and preferably by 3 years.

In the manner as described above, the tendencies of the ingredient contents based on hop plant age can be grasped, thereby making it possible to select the hops having a desired ingredient content. Accordingly, in the method for production of the present invention, for the purpose of making the intended beer taste any of the contents of at least the α-acids, the terpenes, and the polyphenols in the hop can be used as indexes in the selection of hop plant age.

For example, as to Saaz hop, the present inventors reports that the following tendencies are found regarding the above indexes using the crops produced in the year 2011. Here, in order to take influences of various factors such as climates on the hops used into consideration, the following tendencies are mere exemplifications, and it is preferable to grasp the tendencies thereof depending upon use.

<Tendencies of Saaz Hops>

α-Acid: those that are 5-year-old or younger having a high content of from 1.2 to 2.0 times that of those that are 11-year-old or older;

Terpene: those that are 5-year-old or younger containing a larger amount of the sesquiterpenes and a smaller amount of the monoterpenes, but those that are 11-year-old or older containing a smaller amount of the sesquiterpenes and a larger amount of the monoterpenes; and Polyphenol: those that are 5-year-old or younger containing a larger amount of a polyphenol with a low degree of polymerization, thereby increasing a total amount thereof.

As described above, the Saaz hops show greatly different qualities between the hops that are 5-year-old or younger and the hops that are 11-year-old or older in the year 2011. Therefore, when the Saaz hops are used in the production of a beer-taste beverage, it can be seen that the hop plants that are 5-year-old or younger are selected to be preferably used, from the viewpoint of imparting aroma ingredient and body ingredient, and that the hop plants that are 10-year-old or older are selected to be used, from the viewpoint of imparting a splendid hoppy aroma. In addition, in order to impart more remarkable aroma and taste, hop plant age may be selected in the units of timing of addition of the hops. For example, hops that are 10-year-old or older are added to a second-half of a boiling step, whereby a beer-taste beverage rich in a more splendid aroma can be provided. Here, when the selected hops of specified hop plant age are added as mentioned above, it is preferable that the amount of the hops is preferably 30% by weight or more, more preferably 40% by weight or more, and even more preferably 50% by weight or more, of the entire amount of the hops used in the production of the beer-tasting beverage. Also, when the hops are added in plural divided portions, for example, in a case where the selected hops are added in a first-half of the boiling step, all the hops are added so that the above hops account for preferably 30% by weight or more, more preferably 40% by weight or more, and even more preferably 50% by weight or more, of the amount of the entire hops that are added at the same timing. In addition, in a case where the selected hops are added, for example, in a second-half of the boiling step or steps after the boiling step, all the hops are added so that the above hops account for preferably 30% by weight or more, more preferably 40% by weight or more, and even more preferably 50% by weight or more, of the amount of the entire hops that are added at the same timing. Here, the upper limit of the amount cannot be unconditionally set because the upper limit would differ depending upon the timing of addition, the number of times of addition, and the desired effects, the upper limit may be, for example, 100% by weight or less. The term "the same timing" as used herein means not only the timing of addition being the same, but also an entire time period of operating the same work.

In addition, in the present invention, in a case where a body, aroma, and bitterness are provided in a desired balance, those hop plant age having different ingredient contents are mixed with each other, whereby hops adjusted so as to have desired bitterness ingredient content, aroma ingredient content, and body ingredient content may be used.

Thus, it is made possible to add the selected hops having desired ingredient contents.

In the method for producing a beer-taste beverage, hops are mainly added to a wort boil. A first purpose thereof is to isomerize α-acids attributable to bitterness, thereby providing bitterness adapted to a beer-taste beverage. Usually, in the quality design of a beer-taste beverage, the addition of the hops to a wort boil is carried out one to three divided portions. For example, hops are added at an initial stage (early stage) of wort boiling, the isomerization of the α-acids sufficiently progresses to ensure the quality of bitterness, and little α-acids remaining in the hops, so that there would be hardly any losses of the α-acids by removal to the external of the system. On the other hand, hops are added at a second-half of wort boiling or after the fermentation step, whereby evaporation of the terpene attributable to hoppy aroma is suppressed, so that a beer-taste beverage is given with hoppy aroma. In addition, the polymerization of the polyphenol in the hops is suppressed, so that a polyphenol with a low degree of polymerization attributable to a body of the beer-taste beverage remains in the hops. Meanwhile, the isomerization of the α-acids would be insufficient, so that the α-acids would remain in the manufactured article, whereby high-quality bitterness cannot be secured. Regarding the above ingredient, the contents can be set based on hop plant age, thereby making it possible to produce a desired beer-taste beverage. Accordingly, in the method for producing a beer-taste beverage of the present invention, it is preferable that the hops selected based on hop plant age as mentioned above are added during the wort boiling or at the time of beginning of fermentation.

The method for producing a beer-taste beverage of the present invention can be carried out in accordance with a conventional method which is known to one of ordinary skill in the art except for carrying out the step of adding selected hops based on hop plant age as mentioned above. For example, in addition to at least one member selected from the group consisting of barleys such as malts, other grains, starches, and saccharides, raw materials such as bitterness flavors and pigments are optionally supplied to a charging pot or charging tank, an enzyme such as amylase is optionally added to carry out alpha-formation or saccharidization, and husks and the like are removed by filtration to provide a wort, hops selected as mentioned above are subsequently added to the wort obtained and boiled, and solid contents such as coagulated proteins are removed in a clear tank to provide a clear wort. As the conditions in these saccharidizing step, boil-clearing step, solid content-removing step, and the like, known conditions may be used.

Next, in a case of an alcoholic beverage, the alcoholic beverage can be produced by adding an yeast to the clear wort obtained above to allow fermentation, and removing the yeast optionally with a filtration device or the like (also referred to as a fermentation step). As the fermentation conditions, known conditions may be used. In addition, the selected hops mentioned above may be added after the beginning of fermentation. Alternatively, raw materials having alcohol contents such as Spirits may be added instead of going through the fermentation step. Further, an alcoholic beer-taste beverage can be obtained by adding a stored liquor and optionally a carbon dioxide gas thereto, and subjecting to steps of filtration, packing in a vessel, and optionally sterilization.

On the other hand, in a case of a nonalcoholic beverage, the nonalcoholic beverage can be produced by, for example, subsequent to the above solid content-removing step, storing a clear wort obtained above as it is, adding a carbon dioxide gas thereto, and subjecting to steps of filtration, packing in a vessel, and optionally sterilization, without going through the above fermentation step. Alternatively, a nonalcoholic beer-taste beverage can also be obtained by, subsequent to the fermentation step of the above alcoholic beverage, reducing an alcoholic concentration according to a known method such as beer film treatment or dilution.

According to the present invention, it is made possible to highly accurately make and develop a desired beer-taste beverage.

Furthermore, the present invention provides a method for adjusting aroma and taste of a beer-taste beverage, characterized in that the method includes adding selected hops suitable for an intended beer taste based on hop plant age, because the hops having desired ingredient contents as mentioned above can be selected based on hop plant age.

Here, the aroma and taste includes mainly hoppy aroma, a body, bitterness.

Specifically, it is made possible to make and develop a desired quality with a splendid hoppy aroma, a mild hoppy aroma, or a combination of both the qualities of hoppy aromas by adjusting the qualities of hoppy aromas. For example, in a case where the Saaz hops are used, the used ratio of the hop plants that are from 11 to 15-year-olds to be added to a second half of the wort boil is adjusted to preferably 30% by weight or more, more preferably 40% by weight or more, and even more preferably 50% by weight or more, of the amount of the hops added in the same timing, whereby hoppy aromas that are characterized in floral, herbal splendidness can be highly accurately made and developed. In addition, in a case where it is desired to provide an even more splendid aroma that is floral and citrussy, middle-aged hop plants that are from 16 to 20-year-olds may be added to a second-half of the wort boil.

In the adjustment of a body, for example, in a case where the Saaz hops are used, the used ratio of the hop plants that are from 2 to 5-year-olds to be added to a second-half of the wort boil is adjusted to preferably 30% by weight or more, more preferably 40% by weight or more, and even more preferably 50% by weight or more, of the amount of the hops added in the same timing, whereby a milder body accompanied with sweetness can be highly accurately made and developed. For example, in a case where it is desired to provide a milder body accompanied with astringency, young hop plants that are from 6 to 10-year-olds may be added to a second-half of the wort boil.

In the adjustment of bitterness, in order to secure high-quality bitterness, it is necessary to sufficiently isomerize α-acids in the wort boil. Accordingly, for example, in a case where the Saaz hops are used, a high-quality bitterness can be secured by reducing the amounts of infantile hop plants that are 5-year-old or younger or young hop plants that are from 6 to 10-year-olds having a higher content of α-acids used, in the hops to be added to a second-half of the wort boil. In addition, the loss of the α-acids can be reduced.

Thus, some excellent effects are exhibited that the quality of the beer-taste beverage can be highly accurately made and developed by properly adjusting the proportion of the young hop plants, the middle-aged hop plants, or the like depending upon the desired qualities such as bitterness, hoppy aroma, and a body.

Furthermore, in the present invention, it is made possible to prepare a hop processed product rich in the desired ingredient by using the selected hops based on hop plant age or the hop plant age group. Accordingly, the present invention can provide a hop processed product based on hop plant age.

The hop processed product is not particularly limited in its shape, so long as the processed product has given ingredients based on hop plant age, and the shape includes pellets, extracts, dry hop flowers, and the like. Here, the hop processed product can be produced in accordance with a known method depending upon the shape thereof, so long as the hop selected based on hop plant age or hop plant age group is used.

By using the above processed product, a desired beer-taste beverage can be highly accurately made and developed by adding the processed product to the wort boil in the manner, for example, as described by the method for adjusting aroma and taste of beer-taste beverage of the present invention.

EXAMPLES

The present invention will be specifically described hereinbelow by the Examples, without intending to limit the scope of the present invention to the following Examples.

Test Example 1 (Content of Bitterness Ingredient in Hop)

With respect to a hop raw material (variety: Saaz, area of produce: Czech) of different hop plant age, the α-acid content was quantified. Here, the quantitative analysis of the α-acids in the hop raw material was carried out in accordance with a method described in Method 7.7 prescribing the analytical method "Analytica-EBC" published by EBC (European Brewery Convention). The results are shown in Table 1 and FIG. 1.

TABLE 1

| Harvest Year | Hop Plant Age | α-Acid Content of Hop (% by weight) |
|---|---|---|
| 2010 | 2 | 5.1 |
| | 3 | 4.5 |
| | 4 | 5.0 |
| | 10 | 2.8 |
| | 15 | 3.0 |
| | 20 | 2.5 |
| 2011 | 3 | 5.8 |
| | 4 | 6.3 |
| | 5 | 5.2 |
| | 11 | 4.5 |
| | 16 | 3.9 |
| | 21 | 4.1 |

It could be seen from Table 1 and FIG. 1 that the α-acid content, the bitterness ingredient, increased in 5-year-old or younger, and decreased in 10-year-old or older. It was suggested from this finding that the desired bitterness ingredient content can be adjusted depending upon hop plant age. The average α-acid content in all the hop plants cultivated in Czech was 2.7% by weight in the year 2010, and 3.7% by weight in the year 2011 (see Bohemia hop, "Crop Report").

Test Example 2 (Content of Purified Oil Ingredient in Hop)

With respect to a hop raw material (variety: Saaz, area of produce: Czech) of different hop plant age, the content of a purified oil ingredient was quantified. Here, as the quantitative analysis of the purified oil ingredient in the hop raw material, the purified oil ingredient was quantified in accordance with a steam distillation method described in "ASBC Methods of Analysis" prescribing the analytical method published by ASBC (The American Society of Brewing Chemists). The obtained purified oil was further subjected to quantitative analysis of each ingredient of purified oil with GC-MS (TIC mode) under the following conditions. The results are shown in Tables 2 and 3.

<GC-MS Conditions>

Capillary column: manufactured by J&W, DB-WAX (length: 60 m, inner diameter: 0.25 mm, membrane pressure: 0.5 μm)

Oven Temperature: heating from 40° to 240° C. at a rate of 6° C./minute, and holding for 20 minutes Carrier Gas: He Flow Rate of Gas: 1.5 mL/min Transfer Line Temperature: 240° C.

MS Ion Source Temperature: 230° C.

MS Quadrupole Temperature: 150° C.

Front Injection (injector?) Temperature: 240° C.

TABLE 2

| Harvest Year | Hop Plant Age | Total Content of Purified Oil Ingredient in Hop(mL/100 g) |
|---|---|---|
| 2010 | 2 | 0.49 |
| | 3 | 0.62 |
| | 4 | 0.52 |
| | 10 | 0.75 |
| | 15 | 0.53 |
| | 20 | 0.54 |
| 2011 | 3 | 0.44 |
| | 4 | 0.61 |
| | 5 | 0.64 |
| | 11 | 0.71 |
| | 16 | 0.57 |
| | 21 | 0.58 |

TABLE 3

Content of Each Purified Oil Ingredient in Hop(μL/100 g)

| Harvest Year | Hop Plant Age | Monoterpenes | | | | | | Sesquiterpenes | | |
|---|---|---|---|---|---|---|---|---|---|---|
| | | Linalool | Geraniol | Myrcene | Ocimene | β-Pinene | Limonene | Farnessen | Bergamotene | Humulene | Caryophyllene |
| 2010 | 2 | 1.37 | 0.44 | 76.44 | 0.34 | 1.67 | 0.25 | 140.14 | 4.90 | 102.41 | 48.02 |
| | 3 | 2.60 | 0.43 | 206.46 | 0.68 | 2.98 | 0.74 | 149.42 | 4.77 | 104.78 | 42.16 |
| | 4 | 1.04 | 0.16 | 80.08 | 0.52 | 1.46 | 0.36 | 180.96 | 5.30 | 91.52 | 49.40 |
| | 10 | 5.25 | 2.10 | 282.75 | 0.68 | 4.13 | 1.43 | 183.75 | 6.53 | 117.75 | 45.00 |
| | 15 | 3.23 | 1.48 | 168.01 | 0.58 | 2.65 | 0.69 | 137.27 | 4.93 | 87.45 | 35.51 |
| | 20 | 3.08 | 1.35 | 183.60 | 0.70 | 2.97 | 0.76 | 119.34 | 4.21 | 91.80 | 40.50 |
| 2011 | 3 | 1.58 | 0.26 | 112.20 | 0.57 | 1.94 | 0.48 | 83.16 | 3.87 | 132.44 | 37.97 |
| | 4 | 2.32 | 0.24 | 166.53 | 0.55 | 2.01 | 0.61 | 70.76 | 5.06 | 230.58 | 40.38 |
| | 5 | 2.88 | 0.70 | 181.12 | 0.58 | 2.94 | 0.83 | 137.60 | 6.02 | 162.56 | 47.23 |
| | 11 | 3.81 | 1.52 | 285.88 | 0.78 | 3.67 | 1.06 | 130.07 | 5.43 | 127.96 | 34.72 |
| | 16 | 2.91 | 0.91 | 210.90 | 0.86 | 3.08 | 0.91 | 100.32 | 4.28 | 127.11 | 36.59 |
| | 21 | 3.13 | 0.99 | 246.50 | 0.87 | 3.65 | 0.93 | 95.70 | 4.35 | 112.52 | 31.73 |

It could be seen from Table 2 that the total content of the purified oil ingredient did not fluctuate greatly depending upon hop plant age. However, it could be seen from Table 3 that the hop plants of 5-year-old or younger had lower contents of the monoterpenes, and higher contents of the sesquiterpenes. In addition, it could be seen that although the hop plants of 10-year-old or older did not have such a great difference as in the hop plants of 5-year-old or younger, the contents of the sesquiterpenes were higher than those of the monoterpenes. It was suggested from the above that a desired aroma ingredient content could be adjusted depending upon the hop plant age.

Test Example 3 (Content of Body Ingredient in Hop)

With respect to a hop raw material (variety: Saaz, area of produce: Czech) of different hop plant age, the content of a body ingredient was quantified. Here, as the quantitative analysis of the body ingredient in the hop raw material, the quantification of trimeric proanthocyanidin, a polyphenol ingredient, was carried out.

Specifically, first, 20 g of a hop pulverized product was stirred in 2 L of water, and extraction was carried out at 97° C. for 20 minutes, to obtain an extract (a polyphenol fraction). After filtration, the filtrate was allowed to cool in the air, and the cooled filtrate was concentrated at 30° C. under a reduced pressure up to a volume of 100 mL, and the concentrate was freeze-dried to obtain a powder. The yield from the hop was 28%. The HPLC analysis was carried out using the powder obtained, under the conditions shown below. The results of the trimeric proanthocyanidin are shown in Table 4 and FIG. 2.

<HPLC Conditions>
Apparatus: HEWLETT PACKARD SERIES 1100
Column: Inert Sil (GL Sciences Inc. SIL 100A 3 µm, 4.6 mm×150 mm)
Flow Rate: 1.0 mL/min
Mobile Phase: Isocratic elution using a solution of hexane:methanol:tetrahydrofuran:formic acid=45:40:14:1
Amount of Sample Injection: 10 µL,
Detection: Detected at multi-wavelengths from 200 to 300 nm

TABLE 4

| Harvest Year | Hop Plant Age | Content of Trimeric Proanthocyanidin in Hops (mg/5 g) |
|---|---|---|
| 2010 | 2 | 19.2 |
|  | 4 | 19.3 |
|  | 15 | 12.1 |
| 2011 | 3 | 23.0 |
|  | 5 | 22.3 |
|  | 16 | 12.4 |

It could be seen from Table 4 and FIG. 2 that the contents of the trimeric proanthocyanidin ingredient, the body ingredient, were larger in 5-year-old or younger, but markedly decreased in 15-year-old or 16-year-olds. It was suggested from this finding that the contents of the desired body ingredient could be adjusted depending upon hop plant age.

Test Example 4 (Sensory Evaluation 1 for Beer)

<Production of Beer>
One-hundred liters of a filtered wort, obtained by a conventional method, was heated to 98° C. with a boiling pot, and hops were then added in two divided portions so as to have a ratio of α-acid addition as listed in Table 5. Specifically, at the beginning of boiling (0th minute), hop pellets or hop extracts (variety: Saaz, area of produce: Czech) were added in an amount corresponding to from about 20 to about 40% by weight of the entire amount of α-acids added. After the termination of boiling, the heated mixture was held at a temperature of 95° C. or higher for 30 minutes, and each of 130 g of pulverized products of 4 lots of dry hops of Saaz variety being of hop plant age selected of 3, 5, 16 and 21-year-olds (all lots from crops of 2011 produce) was added. While the α-acid contents in the raw materials of hops differ depending upon the differences in hop plant age as shown in Table 1 by adding the same weight thereof, the ratios of the α-acids added at the beginning of boiling and at the termination of boiling were adjusted to those listed in the following Table 5, so that the amount of α-acids would be the same in all cases. After stirring for one minute, a wort pool rest was taken, and rapidly cooled, to prepare a cold wort. An yeast was added to allow fermentation, the fermented mixture was filtered, and a pressure of carbon dioxide gas was then adjusted to produce a beer.

TABLE 5

|  | Ratio of α-Acids Added (% by weight) | | | |
|---|---|---|---|---|
| (Hop Plant Age) | 3 | 5 | 16 | 21 |
| At Beginning of Boiling | 18 | 27 | 44 | 42 |
| At Termination of Boiling | 82 | 73 | 56 | 58 |

<Sensory Evaluation>
Sensory comparative evaluations regarding the aroma characteristics and flavor were made for the produced beers. As the items of sensory evaluations, score comparative evaluations were made on hoppy aroma intensity, and intensities of different aroma characteristics derived from hop oil fractions commercial products sold by Barth-Hass called Pure Hop Aromas (PHA), including floral, fruity, citrussy, and sylvan (woody aroma), were subjected to score comparative evaluation from scores 0 to 3, to a first decimal place (0.1). Besides them, a body (stoutness) accompanying sweetness, and sourness were also evaluated in the same manner. In the sensory evaluation paneling, individuals who can recognize all the characteristics were selected. Since the sensory score ranges differ depending upon the panelists, scores were normalized such that a mean of the scores of all the samples of one panelist was 50 and that a standard deviation was 10, and comparisons between the samples were made. The results are shown in FIG. 3.

According to FIG. 3, as to the body (stoutness) accompanying sweetness attributable to the polyphenol ingredient, the beers produced with an infant hop plant having a high content of the trimeric proanthocyanidin in the hops were given a high evaluation. On the other hand, as to the sourness, the hoppy aroma, floral, fruity, and citrussy, the beers produced with a hop of 16-year-old or 21-year-old, having a high content of the monoterpenes in the hops were given a high evaluation. As described above, it was clarified that the sensory evaluation showed the same tendencies as the tendencies of the hop.

Test Example 5 (Content of Purified Oil Ingredient in Beer)

As to the beers obtained in Test Example 4, as an internal standard material, Borneol was added to the sample so as to have a final concentration of 50 ppb, a 20 g mixture was loaded to a C18 solid phase column, and the subject aroma ingredient was eluted with dichloromethane, dehydrated over sodium sulfate, and concentrated by a reduced pressure concentration. The concentrate was quantified for the ingredients as listed in Table 6 in the same manner as in Test Example 2 according to GC/MS(SIM mode). Here, the aroma characteristics of each of the purified oil ingredients are as listed in Table 7.

<Sensory Evaluation>

The sensory comparative evaluations regarding the aroma characteristics and the taste of the hops for the produced beers were made in the same manner as in Test Example 4.

TABLE 6

| Harvest | Hop | Content of Each of Purified Oil Ingredients in Beer(ppb) | | | | | | | | |
| --- | --- | --- | --- | --- | --- | --- | --- | --- | --- | --- |
| | | Monoterpenes | | | | | Sesquiterpenes | | | |
| Year | Plant Age | Myrcene | D-Limonene | Linalool | Nerol | Geraniol | α-Humulene | β-Caryophyllene | Caryophyllene Oxide | β-Farnessen |
| 2011 | 3 | 5.5 | 1.9 | 9.6 | 1.3 | 3.2 | 1.3 | 0.29 | 0.13 | 8.1 |
| | 5 | 7.4 | 2.0 | 27.2 | 2.0 | 5.3 | 1.0 | 0.17 | 0.16 | 6.3 |
| | 16 | 9.3 | 2.8 | 31.1 | 2.7 | 9.2 | 1.4 | 0.23 | 0.09 | 7.2 |
| | 21 | 10.3 | 3.7 | 31.0 | 2.4 | 8.6 | 1.3 | 0.19 | 0.13 | 6.3 |

TABLE 7

| Each of Purified Oil Ingredient | Aroma Characteristics |
| --- | --- |
| Monoterpenes | |
| Myrcene | peppery terpene spicy balsam plastic |
| D-Limonene | citrus orange fresh sweet |
| Linalool | citrus floral sweet bois de rose woody green blueberry |
| Nerol | sweet natural neroli citrus magnolia |
| Geraniol | sweet floral fruity rose waxy citrus |
| Sesquiterpenes | |
| α-Humulene | woody |
| β-Caryophyllene | sweet woody spice clove dry |
| Caryophyllene Oxide | sweet fresh dry woody spicy |
| β-Farnessen | woody citrus sweet |

According to Table 6, the sesquiterpene contents are likely to be higher in the hop plants of 3-year-old or 5-year-old, and the monoterpene contents are likely to be higher in the hop plants of 16-year-old or 21-year-old, so that it can be deduced that the ingredients involving floral and citrussy aromas reach the maximum at 16-year-old or so. Therefore, it is suggested that the preferred aroma characteristics and intensities can be controlled by selecting hop plant age and properly blending them.

Test Example 6 (Sensory Evaluation 2-1 for Beer)

<Production of Beer>

One-hundred liters of a filtered wort obtained by an ordinary method in the same manner as in Test Example 4 was heated to 98° C. in a boiling pot, and the hops were added in two divided portions so that the added α-acids were in the same amount. Specifically, at the beginning of boiling (0th minute), hop pellets or hop extracts (variety: Saaz, area of produce: Czech) were added in an amount equivalent to about 20 to about 40% by weight of the entire amount of the α-acids. After the termination of boiling, the boiling wort was held at a temperature of 95° C. or higher for 30 minutes, and pulverized products of dry hops of Saaz variety (area of produce: Czech), being of hop plant age of 2-year-old or 15-year-old alone, or base hops (composites, variety: Saaz, area of produce: Czech) were each added in an amount of 130 g. After stirring for one minute, wort pool rest was taken, rapidly cooled, to prepare a cold wort. An yeast was added to allow fermentation, the fermented mixture was filtered, and a pressure of carbon dioxide gas was then adjusted to produce a beer.

In the sensory evaluation items, intensities of hoppy aroma, and floral, citrussy and sylvan (woody) aromas derived from PHA and herbal and esters as other aromas were used. The results are shown in FIG. 4. Here, the significance test according to the Student-t test was conducted. In the figure, "**" means $P<0.01$, and "*" means $P<0.05$.

It could be seen from FIG. 4 that the beers using hops being of hop plant age of 2-year-old had the characteristics of a weaker hoppy aroma, and lowered floral, citrussy or fruity, but a stronger sylvan, as compared to those using the base hops. On the other hand, it could be seen that the beers using hops being of hop plant age of 15-year-old have the characteristics of a stronger hoppy aroma, and also stronger floral, citrussy, and fruity, as compared to those using hops being of hop plant age of 2-year-old.

Test Example 7 (Sensory Evaluation 2-2 for Beer)

<Production of Beer>

One-hundred liters of a filtered wort obtained by an ordinary method in the same manner as in Test Example 4 was heated to 98° C. in a boiling pot, and the hops were added in two divided portions so that the added α-acids were in the same amount. Specifically, in order that the dry hops (area of produce: Czech) of Saaz variety being of hop plant age of 2-year-old or 15-year-old alone were each added after the termination of boiling and holding at a temperature of 95° C. or higher for 30 minutes, in an amount corresponding to 0% by weight, 10% by weight, 20% by weight, 30% by weight, 40% by weight, and 50% by weight of the entire amount of the α-acids added, the hop pellets or hop extracts (variety: Saaz, area of produce: Czech) were added at the beginning of boiling in an amount corresponding to the balance of the amount of the α-acids added. The hops of Saaz variety of hop plant age alone were added and stirred for one minute, wort pool rest was taken, rapidly cooled, to prepare a cold wort. An yeast was added to allow fermentation, the fermented mixture was filtered, and a pressure of carbon dioxide gas was then adjusted to produce a beer.

<Sensory Evaluation>

The sensory comparative evaluations regarding the aroma characteristics and the taste of the hops for the produced beers were made in the same manner as in Test Example 4. In the sensory evaluation items, intensities of hoppy aroma, and floral, fruity, citrussy and sylvan (woody aroma) derived from PHA were used. The results are shown in FIG. 5 (upper rows (A): 2-year-olds, lower rows (B): 15-year-olds). Here, as to sylvan aroma, only beers using hop plants of 2-year-old were evaluated. Also, the significance test according to the Student-t test was conducted. In the figure, "**" means P<0.01, and "*" means P<0.05.

It could be seen from FIG. 5 that in a case of using hops being of hop plant age of 2-year-olds, when the hops were added in an amount of 30% by weight, the hoppy aroma and the floral and fruity were weaker, but on the other hand the sylvan was even stronger. In addition, it could be seen that when the hops were added in an amount of 40% by weight, the hops have weaker citrussy. Also, in a case where the hops being of hop plant age of 15-year-olds were used, when the hops were added in an amount of 30% by weight, the hops have even stronger hoppy aroma or citrussy and fruity. It could be seen that when the hops are added in an amount of 50% by weight, floral was likely to be stronger. It is suggested from the above that at least one of the characteristics of each of the hop plant age that were clarified in Test Example 6 mentioned above is outstanding by adding the hops in an amount of 30% by weight or more.

It could be seen from the above that this tendency is the same regardless of the hop plant age.

Test Example 8 (Sensory Evaluation 3 for Beer)

<Production of Beer>

One-hundred liters of a filtered wort obtained by an ordinary method was heated to 98° C. in a boiling pot, and the hops as listed in the following Table 8 were added so that the added α-acids would be in the same amount. Specifically, at the beginning of boiling (0th minute), hop pellets or hop extracts (variety: Saaz, area of produce: Czech) were added in an amount equivalent to about 20 to about 40% by weight of the entire amount of the α-acids. After the termination of boiling, the boiling wort was held at a temperature of 95° C. or higher for 30 minutes, and pulverized products of dry hops of Hallertauer Tradition variety (area of produce: Germany), being of hop plant age of 5-year-old, 4-year-old, 16-year-old, or 17-year-old, or dry hops (area of produce: Germany) of Hallertauer Mittelfrueh variety (area of produce: Germany), being of hop plant age of 2-year-olds (2 lots), 16-year-old, or 17-year-old were each added in an amount of 130 g. After stirring for one minute, wort pool rest was taken, and rapidly cooled, to prepare a cold wort. An yeast was added to allow fermentation, the fermented mixture was filtered, and a pressure of carbon dioxide gas was then adjusted to produce a beer.

TABLE 8

| Denotation | Variety | Harvest Year | Hop Plant Age |
| --- | --- | --- | --- |
| HT-5-Year-Old | Hallertauer Tradition | 2012 | 5 |
| HT-4-Year-Old | Hallertauer Tradition | 2012 | 4 |
| HT-16-Year-Old | Hallertauer Tradition | 2012 | 16 |
| HT-17-Year-Old | Hallertauer Tradition | 2012 | 17 |
| HM-2-Year-Old | Hallertauer Mittelfrueh | 2012 | 2 |
| HM-2-Year-Old | Hallertauer Mittelfrueh | 2012 | 2 |
| HM-16-Year-Old | Hallertauer Mittelfrueh | 2012 | 16 |
| HM-17-Year-Old | Hallertauer Mittelfrueh | 2012 | 17 |

<Sensory Evaluation>

Figure 7:
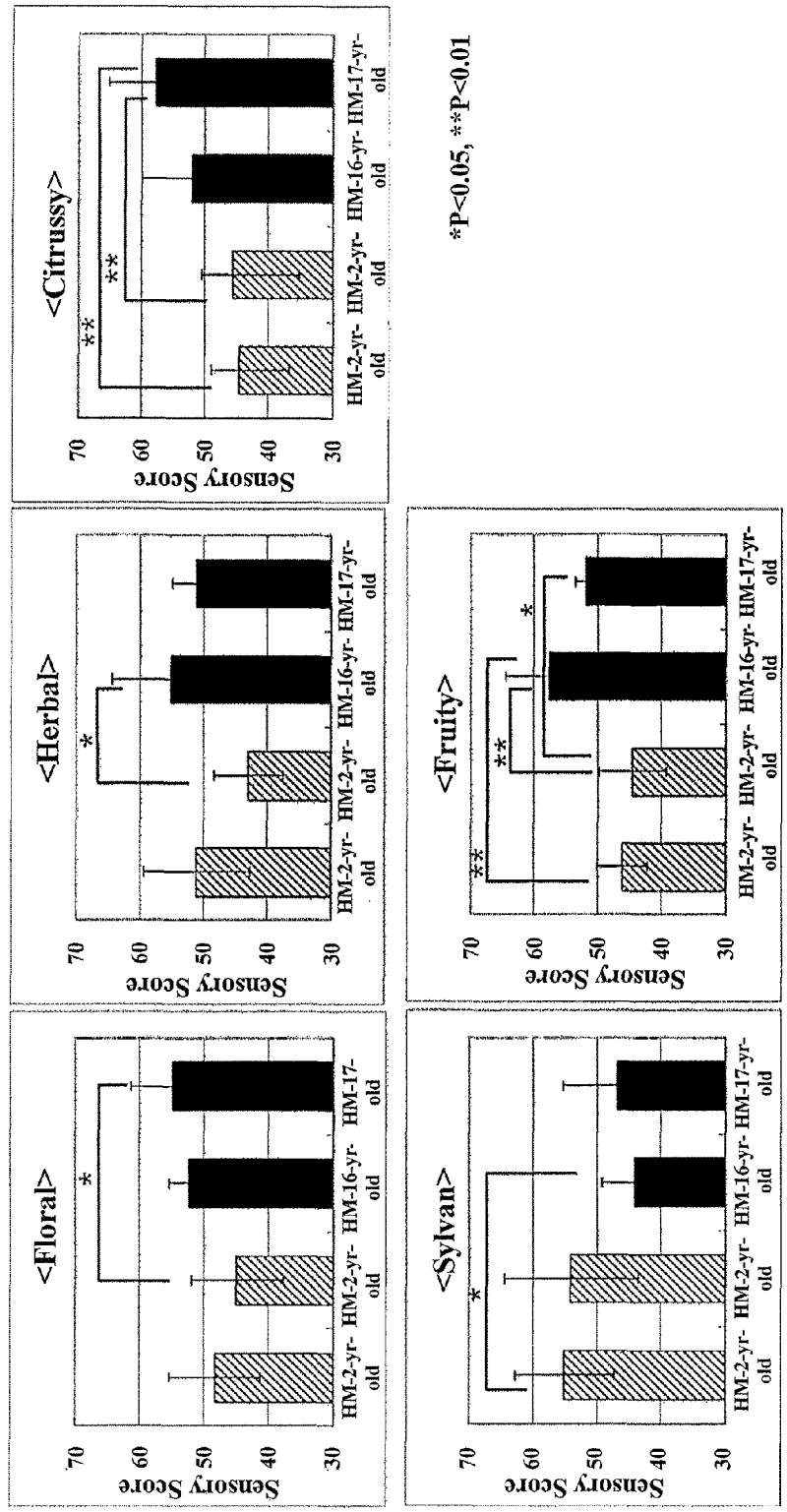
FIG. 7 are graphs showing the results of sensory evaluations for the beers of Examples.

The sensory comparative evaluations regarding the taste of the hops for the produced beers were made in the same manner as in Test Example 4. In the sensory evaluation items, floral, fruity, citrussy and sylvan (woody aroma) derived from PHA and herbal were used. The results are shown in FIGS. 6 and 7. Here, the significance test according to the Student-t test+− was conducted. In the figure, "**" means P<0.01, and "*" means P<0.05.

It was clarified from FIG. 6 that in a case where the hops of Hallertauer Tradition were used, floral, herbal, and fruity were more strongly exhibited in adolescent hop plants and middle-aged hop plants being of hop plant age of 15-year-old and 16-year-old, whereas sylvan was more strongly exhibited in infant hop plants being of hop plant age of 4-year-old and 3-year-old. In addition, it was clarified from FIG. 7 that when the hops of Hallertauer Mittelfrueh were used, floral, herbal, and fruity were more strongly exhibited in adolescent hop plants and middle-aged hop plants being of hop plant age of 15-year-old and 16-year-old, whereas sylvan was more strongly exhibited in infant hop plants being of hop plant age of 1-year-old. It is suggested from these results that the tendencies based on hop plant age are the same even when the varieties of the hops differ.

INDUSTRIAL APPLICABILITY

According to the present invention, characteristics of aroma and taste attributable from different hops can be made into different ones by using hops of different plant age. When hop plants of young age are used, the hop plants have high bitterness-imparting efficiency, and a body (stoutness) accompanying sweetness, so that a moderate aroma can be given, and when hop plants of old age are used, characteristics of strong splendid aroma such as floral and citrussy and refreshing taste having sourness can be given. In addition, crops of different hop plant age having their own characteristics are properly blended, whereby a beer-taste beverage with controlled preferred aroma characteristics and intensities, and taste can be provided.

The invention claimed is:

1. A method for producing a beer-taste beverage rich in aroma ingredient and body ingredient, comprising adding a hop to materials at a first-half of a boiling step so that a total amount of hops with a plant age of 5 years old or less and within a specified age ±2 years is 30% by weight or more of the amount of all hops used in the production of the beer-taste beverage, wherein said plant age of 5 years old or less has a larger amount of α-acids, a larger amount of sesquiterpenes, a smaller amount of monoterpenes, and a larger amount of polyphenols, as compared to plants having an age of at least 10 years old.

2. A method for producing a beer-taste beverage rich in a splendid hoppy aroma, comprising adding a hop to materials at a first-half of a boiling step so that a total amount of hops with a plant age of 10 years old or older and within a specified age ±2 years is 30% by weight or more of the amount of all hops used in the production of the beer-taste beverage, wherein said plant age of 10 years old or older has a smaller amount of α-acids, a smaller amount of sesquiterpenes, a larger amount of monoterpenes, and a smaller amount of polyphenols, as compared to plants having an age of no more than 5 years old.

3. A method for producing a beer-taste beverage rich in aroma ingredient and body ingredient, the method comprising adding hops in divided plural times comprising at least a first-half of a boiling step, wherein the hops with a plant age of 5 years old or less and within a specified age ±2 years are added to materials at a first-half of a boiling step in an amount of 30% by weight or more of a total amount of hops added at the first-half of a boiling step, and wherein said plant age of 5 years old or less has a larger amount of α-acids, a larger amount of sesquiterpenes, a smaller amount of monoterpenes, and a larger amount of polyphenols, as compared to plants having an age of at least 10 years old.

4. A method of adjusting aroma and taste of a beer-taste beverage rich in aroma ingredient and body ingredient, comprising adding a hop to materials at a first-half of a boiling step so that a total amount of hops with a plant age of 5 years old or less and within a specified age ±2 years is 30% by weight or more of the amount of all hops used in the production of the beer-taste beverage, wherein said plant age of 5 years old or less has a larger amount of α-acids, a larger amount of sesquiterpenes, a smaller amount of monoterpenes, and a larger amount of polyphenols, as compared to plants having an age of at least 10 years old.

5. A method of adjusting aroma and taste of a beer-taste beverage rich in a splendid hoppy aroma, comprising adding a hop to materials at a first-half of a boiling step so that a total amount of hops with a plant age of 10 years old or older and within a specified age ±2 years is 30% by weight or more of the amount of all hops used in the production of the beer-taste beverage, wherein said plant age of 10 years old or older has a smaller amount of α-acids, a smaller amount of sesquiterpenes, a larger amount of monoterpenes, and a smaller amount of polyphenols, as compared to plants having an age of no more than 5 years old.

\* \* \* \* \*